Figure 1:
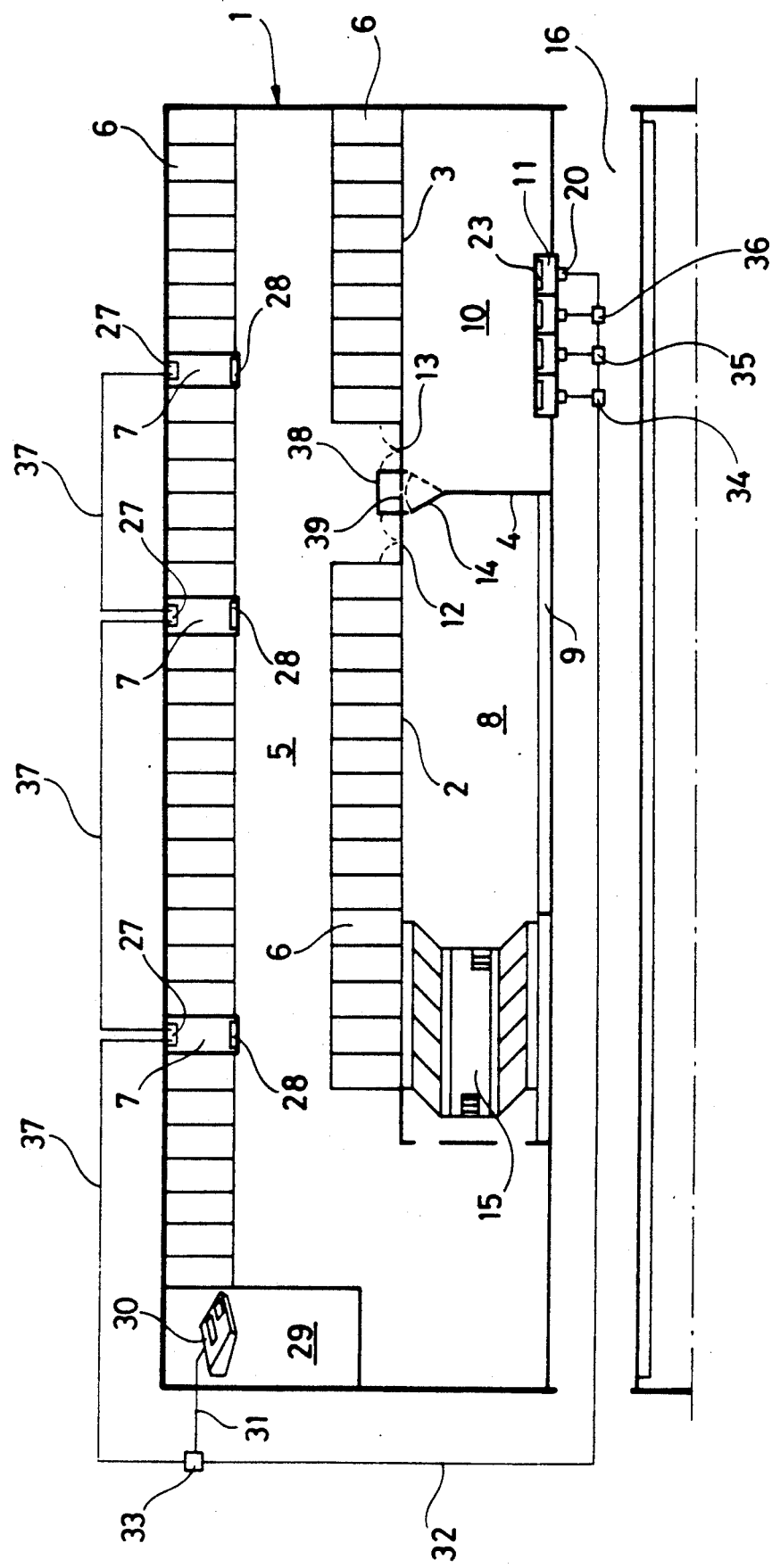

United States Patent [19] … [11] Patent Number: 5,241,924
Lundin et al. … [45] Date of Patent: Sep. 7, 1993

[54] METHOD AND SYSTEM FOR FEEDING COWS

[75] Inventors: Sören Lundin, Märsta; Klaus Schulte, Mölnbo, both of Sweden

[73] Assignee: Alfa-Laval Agri International AB, Tumba, Sweden

[21] Appl. No.: 910,093

[22] PCT Filed: Jan. 16, 1991

[86] PCT No.: PCT/SE91/00025

§ 371 Date: Jul. 7, 1992

§ 102(e) Date: Jul. 7, 1992

[87] PCT Pub. No.: WO91/10358

PCT Pub. Date: Jul. 25, 1991

[30] Foreign Application Priority Data

Jan. 17, 1990 [SE] Sweden ................................ 9000164

[51] Int. Cl.$^5$ ................................................ A01K 5/02
[52] U.S. Cl. ................................................ 119/51.02
[58] Field of Search .................... 119/51.02, 56.1, 57.6

[56] References Cited

U.S. PATENT DOCUMENTS 5,008,821  4/1991  Pratt et al. .................... 119/51.02 X

FOREIGN PATENT DOCUMENTS 3624488  1/1988  Fed. Rep. of Germany .
3601977  4/1986  PCT Int'l Appl. .
9000384  1/1990  PCT Int'l Appl. ............. 119/51.01
8405759-5  5/1986  Sweden .

OTHER PUBLICATIONS

National Institute for Research in Dairying, Report 1979 see project number 07007, 04022, 07008 and 04013.
SHS, Information for oss inom husdjursorganisationen nr. 3, 1989, "Fran forskning till test i radgivning": sid 10–12.
Lantmannen nr. 20/1989, article "Varm losdrift i Kall".

*Primary Examiner*—Robert P. Swiatek
*Attorney, Agent, or Firm*—Hovey, Williams, Timmons & Collins

[57] ABSTRACT

When feeding cows with a fodder supply containing roughage and concentrate fodder, the cows are allowed to consume optional quantities of roughage, while the concentrate fodder is distributed to the cows in individual restricted quantities. According to the invention, the roughage consumption of each cow is measured during an initial predetermined part of the lactation period of the cow, the individual quantity of concentrate fodder to be administered the cow during the remaining part of the lactation period of the cow being determined on basis of at least the measured consumption of roughage of the cow during the initial predetermined part of the lactation period of the cow.

12 Claims, 5 Drawing Sheets

METHOD AND SYSTEM FOR FEEDING COWS

The present invention relates to a method of feeding a stock of cows with a fodder supply containing roughage and concentrate fodder, the cows being allowed to consume optional quantities of roughage, while the concentrate fodder is distributed to the cows in individual restricted quantities, the proper concentrate fodder ration administered to each cow being influenced by the actual roughage consumption of said cow. The invention also relates to a system for such a feeding.

To obtain best possible economy when producing milk, the milk farmer should satisfy the nutriment need of the cows primarily by means of roughage produced of his own, such as ensilage and hay. However, the nutriment content of the roughage varies depending on for instance the point of time of harvesting, composition, manuring and handling at the harvest occasion, with the consequence that the contribution of protein in the form of relatively expensive concentrate fodder, such as grain, pea and rape, normally must be included in the fodder supply, in order to optimize the milk production. Since the concentrate fodder is appreciated by the cows as more tasty than the roughage, the concentrate fodder is distributed in individual predetermined quantities to avoid expensive overconsumption. The overconsumption of concentrate fodder of a cow will not mean increased milk production, on the contrary, it may result in a decreased milk production because of disturbances in the rumen of the cow, for instance by a too large decrease in pH in the latter.

The nutriment need of a cow varies considerably depending on where the cow is in the lactation period. Thus, the nutriment need of the cow is very large in the beginning of the lactation period, while it decreases towards the end of the lactation period. The share of the concentrate fodder of the fodder supply should therefore increase successively in the beginning of the lactation period until the cow produces a maximum of milk, which occurs after about two to three months, and thereafter the share of the concentrate fodder should decrease.

There is a known feeding system for plants with loose housed cows comprising a number of concentrate fodder stations arranged for individual feeding of each cow with concentrate fodder, each cow being able to freely go to any of the concentrate fodder stations. Each cow carries an identification means in the form of a so called transponder, which is sensed by a sensing means at each concentrate fodder station, when the cow stands in position at the concentrate fodder station in question to be fed on concentrate fodder from the latter. A control means in the form of a computer is adapted to control each concentrate fodder station, so that this doses an individually suited ration of concentrate fodder when the sensing means of the concentrate fodder station senses the transponder of a cow.

There is a known feeding system for plants with tied cows comprising a feeding carriage, which is adapted to distribute at least the concentrate fodder to each cow box. The feeding carriage is provided with means for identifying the cows in the respective cow boxes, for instance by means of transponders at the cows, a computer being adapted to control the feeding carriage so that this doses an individually suited ration of concentrate fodder to each identified cow.

However, the conventional feeding systems do not take the real roughage consumption of the cows into full consideration, with the consequence that the individual needs of concentrate fodder of the cows must be determined relatively roughly on the basis of milk production and estimated consumption of roughage. Usually the cows are only divided into two groups consisting of cows with a certified relatively high consumption of roughage and cows with a certified relatively low consumption of roughage. Such a rough system for feeding cows divided into two groups has the drawback that many cows will have too little while others will have too much concentrate fodder, which is uneconomical.

To provide an improved individually suited rationing of concentrate fodder, the actual roughage consumption of each cow could continuously be measured and be the basis of a more accurate determination of the concentrate fodder need of each cow. In connection with the above described known system for loose housed cows, however, a measurement of the roughage consumption of all cows would result in the problem that a too large number of measuring stations with weighing equipment would need to be installed, which would make such an investment unprofitable. Unlike concentrate fodder, which is compact in consistency and therefore can be rapidly consumed by a cow, roughage is very voluminous and takes a long time for a cow to consume, with the consequence that many roughage stations would be required. In addition, the flock behaviour of the cows gives rise to the phenomenon that many cows are tempted to feed at the same time as others, which results in a need of further roughage stations to avoid disturbances between the cows. For instance, often only two concentrate fodder stations are sufficient to attend the feeding of concentrate fodder to a stock of fifty cows, whereas more than eleven roughage stations would be needed to attend the feeding of roughage.

In the above described system for feeding tied cows it would be needed to install a weighing equipment for roughage at each cow box, which also would be unprofitable.

The object of the present invention is to provide a new improved method of feeding of the kind here present, by which the actual consumption of roughage of each cow is considered when determining the individual ration of concentrate fodder to be distributed to the cow. A further object of the present invention is to provide new feeding systems for accomplishing the new method of feeding.

These objects are obtained by a method of feeding of the kind initially stated, which mainly is characterized by measuring the roughage consumption of each cow during an initial predetermined part of her lactation period, during which initial part said roughage consumption rapidly increases to a maximum, registering said maximum of roughage consumption of the cow, determining the concentrate fodder ration to be administered to the cow during the remaining part of her lactation period in response to said registered maximum of roughage consumption, and feeding said determined concentrate fodder ration to the cow during the remaining part of her lactation period, while allowing her to continue to consume optional quantities of roughage.

It should be understood that said "maximum" of the roughage consumption occurs at some point of time during the lactation period.

Hereby, the advantage is obtained that only the roughage consumption of a minority, about 30%, of the stock of cows need to be continuously measured to give the necessary values of said maximum of roughage consumption required for determining the individual concentrate fodder needs of all the cows in the stock, provided that the lactation periods of the cows are evenly spread over the year.

The voluntary consumption of roughage of each cow increases sharply just before and after calving. The roughage consumption is stabilized at said maximum when two to three months have passed of the lactation period and the milk yield is at a maximum. The roughage consumption of each cow during the remaining part of the lactation period can be predicted with a relatively good accuracy with the aid of the noted maximum roughage consumption of the cow during the initial two to three months of the lactation period. It is this understanding which forms the basis of the present invention.

Each cow, which is in said initial predetermined part of the lactation period, is suitably fed separately on roughage.

To facilitate the separate feeding of the cows being in said initial predetermined part of the lactation period, these cows may be kept separated from other cows.

The roughage consumption of the cows being in said initial part of the lactation period is preferably measured by weighing. As an alternative, the volume of the consumed roughage may be measured if the relationship between weight and volume of the roughage does not vary.

The present invention also relates to a new system for feeding a loose housed stock of cows with a fodder supply containing roughage and concentrate fodder, comprising a roughage station for communal feeding of the cows with optional quantities of roughage, at least one concentrate fodder station for individual dosing of concentrate fodder to each cow, identification means adapted to be carried by individual cows, at least one sensing means for sensing the identification means, each concentrate fodder station being provided with a sensing means arranged, such that this senses the identification means of a cow standing in position at the concentrate fodder station to be fed on concentrate fodder from this, and control means adapted to control each concentrate fodder station, so that this doses concentrate fodder when the sensing means of the concentrate fodder station senses the identification means of a cow, the proper concentrate fodder ration administered to each cow being influenced by the actual roughage consumption of the cow. The new feeding system for loose housed cows is mainly characterized in that at least one separate roughage station is arranged for individual feeding with optional quantities of roughage, that selective means are adapted only to allow each cow being in an initial predetermined part of the lactation period during which the roughage consumption of the cow rapidly increases to a maximum, to visit each separate roughage station and to prevent the cow from visiting the communal roughage station, that each separate roughage station is provided with a measuring device for measuring the quantity of roughage consumed by a visiting cow, and a further sensing means for sensing the identification means of a cow standing in position at the separate roughage station to be fed on roughage, that a register means is adapted to registrate said maximum of the roughage consumption of each cow visiting each separate roughage station in response to the measuring device and the further sensing means at said separate roughage station, and that said control means are adapted to control each concentrate fodder station in response to said registered maximum of the roughage consumption of each cow, such that said concentrate fodder station doses an individually determined ration of concentrate fodder to the cow during the remaining part of the lactation period of the cow.

According to a preferred embodiment of the new feeding system for loose housed cows the selective means comprise an enclosure for the cows, and walls dividing the enclosure into a main area, in which all cows can freely move and in which each concentrate fodder station is located, a first area for feeding roughage, in which the communal roughage station is located, and a second area for feeding roughage, in which each separate roughage station is located, which walls form at least a first passage between the main area and the first feeding area and at least a second passage between the main area and the second feeding area. The selective means further comprise means for blocking the first and second passages adapted to only allow the cows which are not in said initial predetermined part of the lactation period to pass through each first passage, and to only allow the cows which are in said predetermined part of the lactation period to pass through each second passage.

Hereby, the advantage is obtained that the established order of rank of the cows is not disturbed, since all of the cows can be together in the main area of the enclosure. Thus, the piece and order of the cow stock is maintained irrespective of which of the cows being in the early lactation at the time.

According to another embodiment of the new feeding system for loose housed cows the selective means comprise a first enclosure for the cows not being in said initial predetermined part of the lactation period, the communal roughage station and at least one concentrate fodder station being located in said first enclosure, and a second enclosure for the cows being in said initial predetermined part of the lactation period, each separate roughage station and at least one concentrate fodder station being located in said second enclosure.

The advantage of this embodiment is that supervision of the early lactation cows is facilitated, since these are kept assembled in said second enclosure in a group separate from the other cows. However, a drawback is that the risk of disturbances between the cows increases, since the composition of the two groups of early lactation cows and late lactation cows is continuously changed, which forces the cows frequently to settle new orders of rank.

The present invention also relates to a new system for feeding tied cows with a fodder supply containing roughage and concentrate fodder, comprising a plurality of boxes for the cows, a fodder table for feeding the cows with optional quantities of roughage extending along the boxes, a feeding device for dosing concentrate fodder to each cow, identification means for identifying each cow, and control means for controlling the feeding device for concentrate fodder, so that this doses individual doses of concentrate fodder to the cows in response to said identification means, the proper concentrate fodder ration administered to each cow being influenced by the actual roughage consumption of the cow. The new feeding system for tied cows is mainly characterized in that each box accomodating a cow being in an initial predetermined part of the lactation period, during which the roughage consumption of the cow rapidly increases to a maximum, is provided with a measuring device for measuring the roughage consumption of the cow, that a register means is adapted to registrate said maximum of roughage consumption of each cow being in said initial part of the lactation period in response to the identification means and each measuring device, and that said control means are adapted to control the feeding device for concentrate fodder in response to said registered maximum of the roughage consumption of each cow during the initial part of the lactation period of the cow, such that the feeding device for concentrate fodder doses an inidividually determined ration of concentrate fodder to the cow during the remaining part of the lactation period of the cow.

Hereby, the advantage is obtained that the required number of measuring devices for measuring the roughage consumption only need to amount to about 30% of the number of cows, i.e. to the number of the cows which at the time is early in lactation. Of course, the condition of this is that the lactation periods of the cows are evenly spread over the year.

Figure 2:
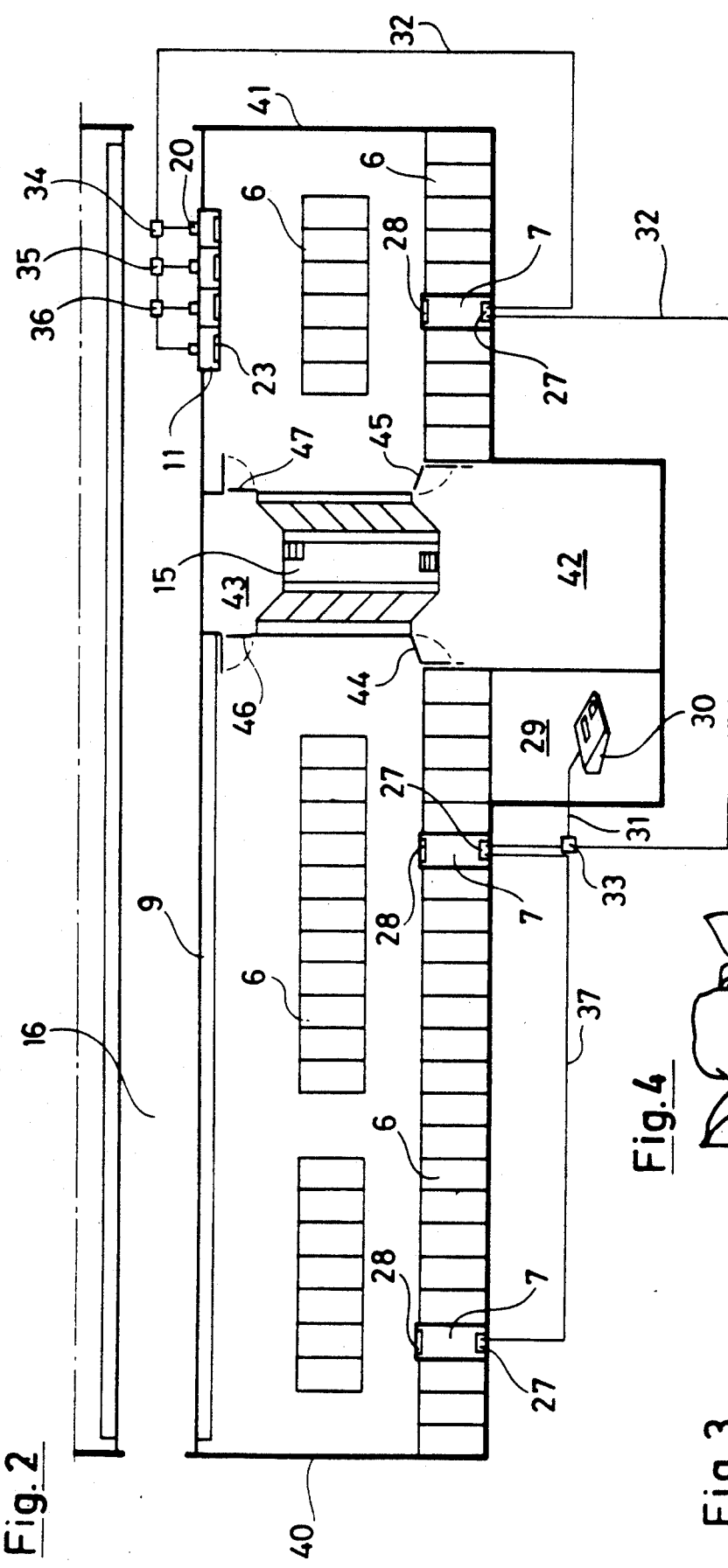
Figure 4:
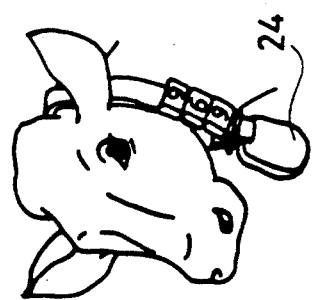
Figure 3:
Figure 6:
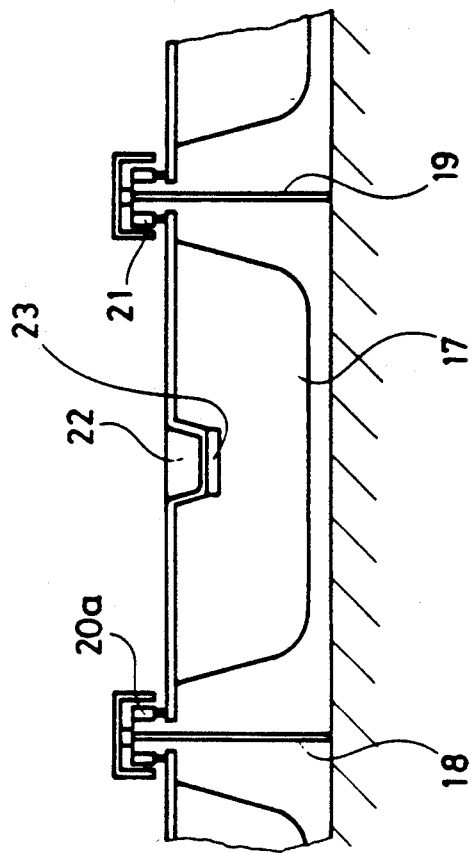
Figure 5:
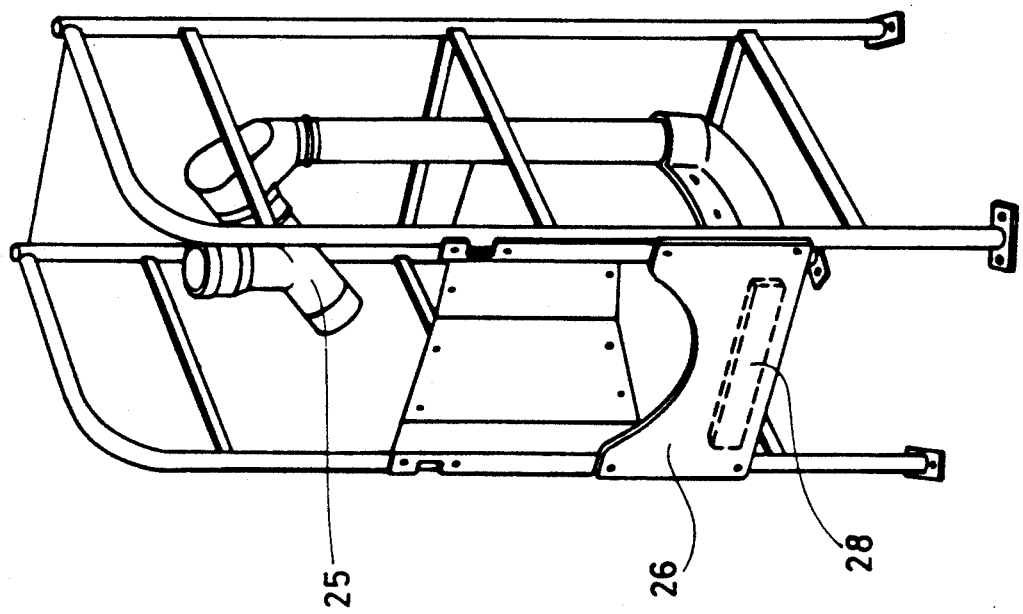
Figure 7:
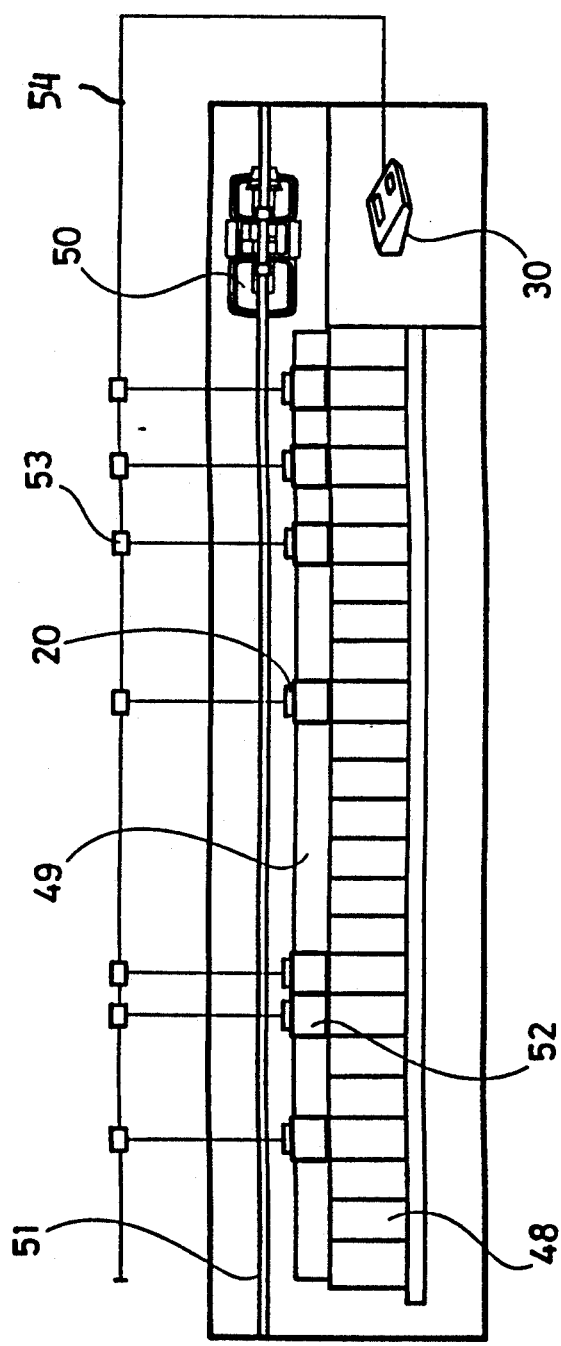
Figure 8:
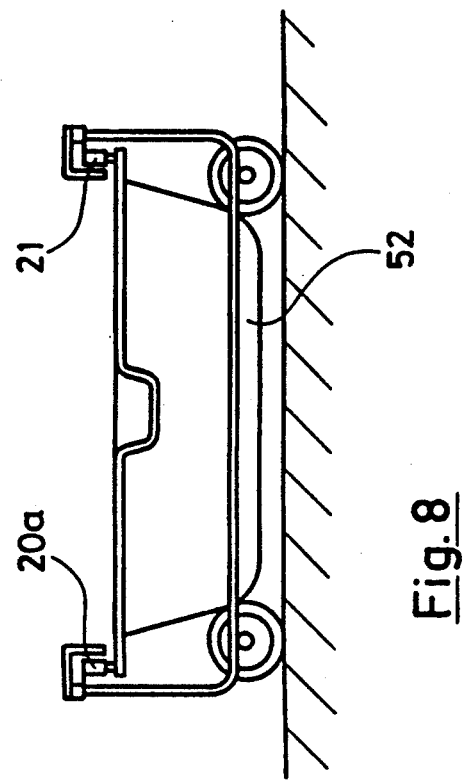
Figure 9:
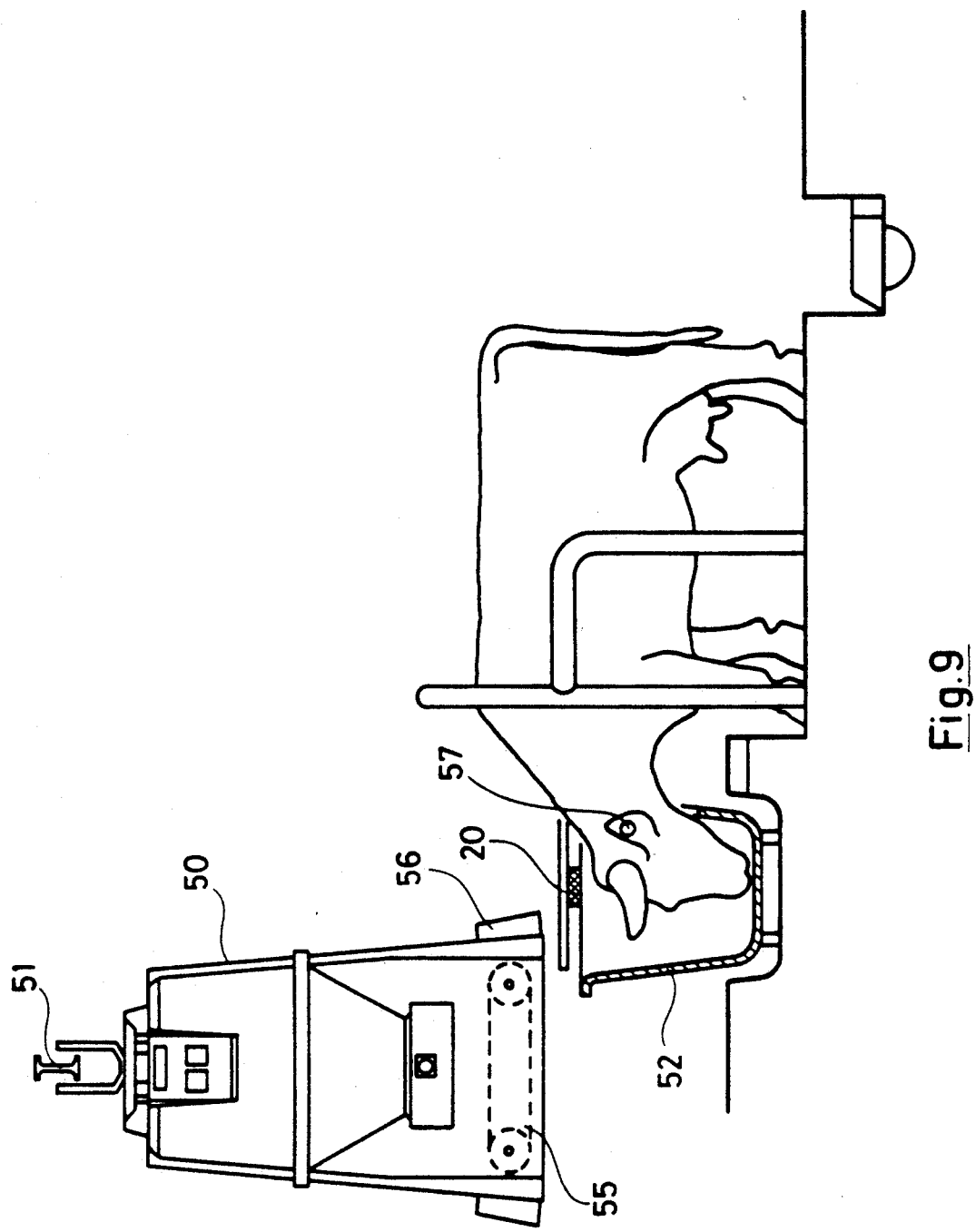

The invention is explained more closely in the following with reference to the accompanying drawings, in which FIG. 1 schematically shows a preferred embodiment of the feeding system according to the invention, FIG. 2 shows an alternative embodiment of the system according to the invention, FIG. 3 shows a sensing means, FIG. 4 shows an identification means, FIG. 5 shows a concentrate fodder station, FIG. 6 shows a roughage station equipped with a weighing means, FIG. 7 shows a further alternative embodiment of the system according to the invention, FIG. 8 shows a fodder receptacle for the system according to FIG. 7 and FIG. 9 shows a cow box in the system according to FIG. 7.

The components which correspond to each other in the figures have been given the same reference numerals.

The feeding system shown in FIG. 1 is intended for loose housed cows and comprises an enclosure 1 for the cows, which by means of walls 2-4 is divided into a main area 5, in which fiftyfive rest boxes 6 and three concentrate fodder stations 7 are located, a first area 8 for feeding roughage, in which a roughage station in the form of a fodder table 9 for communal feeding of roughage is located, and a second area 10 for feeding roughage, in which four separate roughage stations 11 for individual feeding of roughage are located. Two passages between the main area 5 and the first and second areas 8, 10, respectively, are provided with gates 12 and 13, respectively, which only are openable by cows on their way out of the areas 8, 10. An entrance gate 14 to the areas 8, 10 is arranged to close in a turning position the passage to the first area 8 while the passage to the second area 10 is kept free, and to close in another turning position the passage to the second area 10 while the passage to the first area 8 is kept free.

A plant 15 for milking the cows is arranged in connection to the first area 8 and forms a passage from the main area 5 to the first area 8. Outside the enclosure 1 a transport path 16 extends along the first and second areas 8, 10. The transport path 16 is intended to be utilized by for instance a roughage carriage (not shown) for replenishment of roughage in the separate roughage stations 11 and on the communal roughage table 9.

Each separate roughage station 11 has a receptacle 17 for the fodder, which is suspended from a frame work 18, 19 situated at mutual sides of the receptacle 17 (FIG. 6). A weighting device 20 comprises loading cells 20a, 21, which are arranged between the frame works 18, 19 and the receptacle 17 for sensing the weight of the receptacle. The receptacle 17 has an opening 22, through which a cow can penetrate its head to reach the roughage in the container 17. Below the opening 22 there is a sensing means 23 in the form of an elongated antenna, a so called "reader" (FIG. 3), which is attached to the outside of the receptacle 17. The reader 23 is intended to sense identification means 24 in the form of so called "transponders" (FIG. 4), which are carried by individual cows for identifying these.

Each concentrate fodder station 7 is provided with a controllable dispensing device 25 for the concentrate fodder (FIG. 5), which is adapted to portion the concentrate fodder in a fodder manger 26. A control means 27 is connected to the dispensing device 25 and a reader 28, which is attached to the fodder manger 26, for individual portioning of concentrate fodder to a visiting cow being identified by the reader 28.

In a control room 29 there is a manoeuvre station 30, comprising a register unit and a central control unit, which is connected to the register unit. The manoeuvre station 30 is via conduits 31, 32 and matching units 33-36 (so called interfaces) connected to the weighing device 20 and the reader 23 of each separate roughage station 11. The matching units 33-36 are of the known type which transform analogous signals into groups of digital signals, the transmission of the digital signal groups taking place by bussing these through one single conduit. Also the control means 27 of the concentrate fodder stations 7 are provided with such matching units. The control means 27 are connected to the manoeuvre station 30 via a conduit 37, the matching unit 33 and the conduit 31.

The manoeuvre station 30 is connected to a portal antenna 38 for sensing the transponder 24 of a cow, which makes her way from the main area 5 to the entrance gate 14, and a device (not shown) for turning the entrance gate 14. The central control unit of the manoeuvre station 30 is adapted to control the entrance gate 14 in response to the portal antenna 38, when this senses the transponder 24 of a cow, such that the cow enters her allotted area for the roughage feeding. Between the portal antenna 38 and the entrance gate 14 there is a double gate 39, which is adapted to be kept closed until the entrance gate 14 has taken the correct turning position, when a cow identified by the portal antenna 38 is about to make her way into any of the areas 8 and 10.

During operation of the feeding system according to FIG. 1 the register unit of the manoeuvre station 30 is continuously stored with information on which of the cows are early in lactation at the time, i.e. the cows which have lactated about three months at the most of the lactation period. With the aid of the stored information of the register unit, the central control unit of the manoeuvre station 30 controls the entrance gate 14, so that early lactation cows, which are identified by the portal antenna 38, only are released into the second area 10, while late lactation cows identified in the same manner are only released into the first area 8. Thus, the transponder 24 of each cow functions as a key to one of the first and second areas 8 and 10, respectively. The concentrate fodder stations 7 are accessible to all the cows.

The voluntary consumption of roughage of the early lactation cows is measured by means of the weighing device 20 in the separate roughage stations 11 and the maximum values are stored in the register unit of the manoeuvre station 30. When a cow, which is in the early lactation stage, passes into the late lactation stage, the central control unit of the manoeuvre station 30 determines the concentrate fodder ration to be administered to the cow during her remaining part of the lactation period, about seven months, in response to the stored value of her maximum roughage consumption.

The register unit of the manoeuvre station 30 may also be utilized for registration of the visiting frequency of the cows at the separate roughage stations 11. An increasing visiting frequency of a cow indicates that the cow in question is on heat.

When the cows are to be milked the cows are collected in the main area 5 in front of the milking plant 15 and enter into this in the established order of rank of the cows. After milking, all the cows must pass the first area 8 to arrive at the main area 5 via the exit gate 12.

In FIG. 2 there is shown an alternative feeding system for loose housed cows, including a first enclosure 40 for the early lactation cows, in which forty rest boxes 6, a fodder table 9 for roughage and two concentrate fodder stations 7 are located, and a second enclosure 41 for the late lactation cows, in which fifteen rest boxes 6, four separate roughage stations 11 and one concentrate fodder station 7 are located. A milking plant 15 is located in a separate space between the two enclosures 40, 41. Said space is divided by the milking plant 15 into an entrance area 42 and an exit area 43. In passages from the first and second enclosures 40, 41 to the entrance area 42, there are entrance gates 44 and 45, and in passages from the exit area 43 to the first and second enclosures 40, 41, there are exit gates 46 and 47. The gates 44-47 are arranged to be manoeuvred manually by the milker.

In the system according to FIG. 2 the late lactation cows are kept completely separated from the early lactation cows also during milking. When the early lactation cows are to be milked the milker opens the entrance gate 44, while the other gates are kept closed, so that the early lactation cows can be collected in the entrance area 42 and therefrom enter the milking plant 15. Finished milked cows walk via the exit area 43 and the exit gate 46, which is opened by the milker, back to the enclosure 40. In the same manner the late lactation cows are milked, such that the milker only opens the entrance gate 45 and later the exit gate 46.

A drawback to the system according to FIG. 2 is that the cows frequently must settle their order of rank, since the composition of the early lactation and the late lactation cow stocks regularly is changed, which may give rise to disturbances between the cows. However, the system according to FIG. 2 has the advantage compared with the system according to FIG. 1 that the roughage consumption of the early lactation cows can be determined with almost 100% certainty. In the system according to FIG. 1, there is a risk of the early lactation cows consuming a part of roughage from the common fodder table 9 after milking, when they are in the area 8, before the cows make their way to the main area 5.

In FIG. 7 there is shown a feeding system for tied cows, including twentyfour boxes 48, in which the cows are kept tied. Thus, the cows are milked without leaving the boxes 48. Alternatively, the cows may leave the boxes 48 when it is time for milking, the milking occurring in a separate milking plant, for instance of the type shown in the systems according to FIGS. 1 and 2. A fodder table 49 extends along all the boxes 48 and a feeding carriage 50 for concentrate fodder is displaceable via a roof suspended rail 51 along the fodder table 49 for dosing concentrate fodder onto the fodder table 49 in front of each box 48. The roughage is distributed onto the fodder table from a floor going roughage carriage not shown. (Usually, the concentrate fodder carriage 50 is arranged to serve two parallel rows of cow boxes 48, but for simplicity there is only shown one row of cow boxes in FIG. 7).

On the fodder table 49 there are seven displaceable receptacles 52 placed in front of the cow boxes, housing the early lactation cows. Each receptacle 52 is provided with a weighing device 20 of the same type as shown in FIG. 6 and a matching unit 53, which is connected to the weighing device 20. The matching units 53 are connected to a conduit 54, which extends along the boxes 48 to a monoeuvre station 30 of the same type as described in the systems according to FIGS. 1 and 2.

The concentrate fodder carriage 50 is provided with a controllable dispensing device 55 for the concentrate fodder, which is connected to the central control unit of the manoeuvre station 30 via conduits not shown. A reader 56 is attached to the concentrate fodder carriage 50 for sensing transponders 57, which are attached to the respective cows.

During operation of the feeding system according to FIG. 7 the early lactation cows consume their roughage from respective receptacles 52, the weighing device 20 of each receptacle 52 measuring the weight of the consumed roughage. However, the early lactation cows also consume their concentrate fodder from the receptacles 52, since the concentrate fodder carriage 50 doses the concentrate fodder in these when passing the early lactation cows, whereby the concentrate fodder is mixed with the roughage. To obtain a correct value of the weight of the roughage consumed by each early lactation cow, the weight of the dosed concentrate fodder, which is predetermined and therefore known, is subtracted from the weight of the measured mixture of consumed roughage and concentrate fodder. The maximum values of the roughage consumption of the early lactation cows are stored in the register unit of the manoeuvre station 30.

When an early lactation cow passes into the late lactation stage the receptacle 52 is removed from the box 48 of the cow and by means of the central control unit of the manoeuvre station 30 the ration of concentrate fodder to be administered to the cow during her remaining part of the lactation period is determined in response to the stored value of her maximum roughage consumption.

We claim:

1. A method of feeding a stock of cows with a fodder supply containing roughage and concentrate fodder, in which the cows are allowed to consume optional quantities of roughage, while the concentrate fodder is distributed to the cows in individual restricted rations, the proper concentrate fodder ration administered to each cow being influenced by the actual roughage consumption of the cow, characterized by measuring the roughage consumption of each cow during an initial predetermined part of her lactation period, during which initial part said roughage consumption rapidly increases to a maximum, registering said maximum of roughage consumption of the cow, determining the concentrate fodder ration to be administered to the cow during the remaining part of her lactation period in response to said registered maximum of roughage consumption, and feeding said determined concentrate fodder ration to the cow during the remaining part of her lactation period, while allowing her to continue to consume optional quantities of roughage.

2. A method according to claim 1, characterized in that each cow which is in said initial predetermined part of the lactation period is fed separately on roughage.

3. A method according to claim 2, characterized in that the cows which are in said initial predetermined part of the lactation period are kept separated from other cows.

4. A method according to claim 1, characterized in that the roughage consumed by each cow during said initial predetermined part of the lactation period is measured by weighing.

5. A method according to claim 1, characterized in that said initial predetermined part of the lactation period is selected in the interval of two to three months counted from the beginning of the lactation period.

6. A system for feeding a stock of loose housed cows with a fodder supply containing roughage and concentrate fodder, comprising a roughage fodder station (9) for communal feeding of the cows with optional quantities of roughage, at least one concentrate fodder station (7) for individual dosing of concentrate fodder to each cow, identification means (24), adapted to be carried by individual cows, at least one sensing means (28) for sensing the identification means, each concentrate fodder station being provided with a sensing means arranged so that this senses the identification means of a cow, which stands in position at the concentrate fodder station to be fed on concentrate fodder from this, and control means (30, 27), which are adapted to control each concentrate fodder station, so that this doses concentrate fodder when the sensing means of the concentrate fodder station senses the identification means of a cow, the proper concentrate fodder ration administered to each cow being influenced by the actual roughage consumption of the cow, characterized in that at least one separate roughage station (11) is arranged for individual feeding with optional quantities of roughage, that selective means (1, 2–4, 12–14, 38, 39; 40, 41) are adapted only to allow each cow being in an initial predetermined part of the lactation period during which the roughage consumption of the cow rapidly increases to a maximum, to visit each separate roughage station (11) and to prevent the cow from visiting the communal roughage station (9), that each separate roughage station (11) is provided with a measuring device (20) for measuring the quantity of roughage consumed by a visiting cow, and a further sensing means (23) for sensing the identification means (24) of a cow standing in position at the separate roughage station (11) to be fed on roughage.

that a register means is adapted to registrate said maximum of the roughage consumption of each cow visiting each separate roughage station (11) in response to the measuring device (20) and the further sensing means (23) at said separate roughage station, and that said control means (30, 27) are adapted to control each concentrate fodder station in response to said registered maximum of the roughage consumption of each cow, such that said concentrate fodder station doses an individually determined ration of concentrate fodder to the cow during the remaining part of the lactation period of the cow.

7. A system according to claim 6, characterized in that the selective means comprise an enclosure (1) for the cows, walls (2–4), dividing the enclosure into a main area (5), in which all the cows can freely move and in which each concentrate fodder station (7) is located, a first area (8) for feeding roughage, in which the communal roughage station (9) is located, and a second area (10) for feeding roughage, in which each separate roughage station (11) is located, which walls (2–4) form at least a first passage between the main area (5) and the first feeding area (8) and at least a second passage between the main area (5) and the second feeding area (10), and means (12–14, 38, 39) for blocking the first and second passages adapted only to allow the cows not being in said initial predetermined part of the lactation period to pass through each first passage, and only to allow the cows being in said predetermined part of the lactation period to pass through each second passage.

8. A system according to claim 6, characterized in that the selective means comprise a first enclosure (40) for the cows not being in said initial predetermined part of the lactation period, the communal roughage station (9) and at least one concentrate fodder station (7) being located in said first enclosure (40), and a second enclosure (41) for the cows being in said initial predetermined part of the lactation period, each separate roughage station (11) and at least one concentrate fodder station (7) being located in said second enclosure (41).

9. A system according to claim 6, characterized in that measuring device of each separate roughage station (11) is constituted by a weighing means (20).

10. A system for feeding tied cows with a fodder supply containing roughage and concentrate fodder, comprising a plurality of boxes (48) for the cows, a fodder table (49) for feeding the cows with optional quantities of roughage extending along the boxes, a feeding device (50) for dosing concentrate fodder to each cow, identification means (56, 57) for identifying each cow, and control means (30) for controlling the feeding device for concentrate fodder, so that this doses individual doses of concentrate fodder to the cows in response to said identification means, the proper concentrate fodder ration administered to each cow being influenced by the actual roughage consumption of the cow, characterized in that each box (48) accommodating a cow being in an initial predetermined part of the lactation period, during which the roughage consumption of the cow rapidly increases to a maximum, is provided with a measuring device (20, 52) for measuring the roughage consumption of the cow, that a register means is adapted to registrate said maximum of roughage consumption of each cow being in said initial part of the lactation period in response to the identification means (56, 57) and each measuring device (20), and that said control means (30) are adapted to control the feeding device (50) for concentrate fodder in response to said registered maximum of the roughage consumption of each cow during the initial part of the lactation period of the cow, such that the feeding device (50) for concentrate fodder doses an individually determined ration of concentrate fodder to the cow during the remaining part of the lactation period of the cow.

11. A system according to claim 10, characterized in that each measuring device comprises a displaceable receptacle (52) for roughage, and a weighing device (20) for weighing the receptacle (52).

12. A system according to claim 10, characterized in that the feeding device for concentrate fodder comprises a feeding carriage (50), which is displaceable to each box.

* * * * *